US012275031B2

(12) United States Patent
Lo

(10) Patent No.: US 12,275,031 B2
(45) Date of Patent: Apr. 15, 2025

(54) WATERING DEVICE

(71) Applicant: YUAN MEI CORP., Chang Hua Hsien (TW)

(72) Inventor: Shun Nan Lo, Chang Hua Hsien (TW)

(73) Assignee: YUAN MEI CORP., Chang Hua Hsien (TW)

( * ) Notice: Subject to any disclaimer, the term of this patent is extended or adjusted under 35 U.S.C. 154(b) by 556 days.

(21) Appl. No.: 17/828,720

(22) Filed: May 31, 2022

(65) Prior Publication Data

US 2022/0288611 A1 Sep. 15, 2022

Related U.S. Application Data

(62) Division of application No. 16/785,112, filed on Feb. 7, 2020.

(51) Int. Cl.
*B05B 3/04* (2006.01)
*B05B 1/30* (2006.01)

(52) U.S. Cl.
CPC .......... *B05B 3/0486* (2013.01); *B05B 3/0463* (2013.01); *B05B 1/3006* (2013.01)

(58) Field of Classification Search
CPC .... B05B 3/0486; B05B 3/0463; B05B 1/3006
See application file for complete search history.

(56) References Cited

U.S. PATENT DOCUMENTS

| | | | | |
|---|---|---|---|---|
| 4,802,628 A * | 2/1989 | Dautel | B05B 3/0463 239/227 |
| 5,217,166 A * | 6/1993 | Schulze | B05B 3/0463 239/227 |
| 6,129,293 A * | 10/2000 | Jager | B05B 3/0463 239/391 |
| 9,931,652 B2 | 4/2018 | Ferrarini | |
| 2003/0173421 A1* | 9/2003 | Schorn | B05B 3/0418 239/380 |

FOREIGN PATENT DOCUMENTS

TW I611846 B 1/2018

* cited by examiner

*Primary Examiner* — Steven M Cernoch
(74) *Attorney, Agent, or Firm* — Muncy, Geissler, Olds & Lowe, P.C.

(57) ABSTRACT

A rotor nozzle structure has a chamber deployed with a rotor connecting to the water outlet and an adjusting element, wherein the rotor nozzle is capable of generating a directing stream and a wide-angle swirl stream, and the adjusting element is switchable by a rotational means for driving the rotor in a rotation or static status in the chamber.

6 Claims, 6 Drawing Sheets

100

WATERING DEVICE

CROSS REFERENCE TO RELATED APPLICATIONS

This application is a Divisional of co-pending application Ser. No. 16/785,112, filed on Feb. 7, 2020, for which priority is claimed under 35 U.S.C. § 120; the entire contents of all of which are hereby incorporated by reference.

BACKGROUND OF THE INVENTION

1. Field of the Invention

This creation relates to a watering device; to be more concrete, as an integral structure for outputting a directing stream or a wide-angle swirl stream and watering purposes.

2. Description of the Related Art

The conventional structure of rotor nozzle as claimed in U.S. Pat. No. 9,931,652 disclosed a housing (2) having a conical chamber (3) as an accommodation for a rotor (12), the rotor (12) having one end deployed with a water outlet (14) connecting to the outlet opening (6 of the spray gun, and the intermediate element (25) having a spherical surface against inner wall of the conical chamber (3) for the rotor (12) in an eccentric arrangement to the longitudinal axis of the conical chamber (3). In this way, the fluid flowed into the chamber (3) by its lateral current rotating the rotor (12) then turned into a wide-angle swirling steam, 360 degrees, running out of the outlet opening (6).

For outputting a directing stream or a wide-angle swirl stream from the integral structure of rotor nozzle, patent TW1611846 generates a swirl stream (6c) by its lateral sides of the swirling tunnel (6c), and the opening (6b) for producing the lateral current was deployed beside the opening (6a) for generating a direct stream.

SUMMARY OF THE INVENTION

This creation aims to provide a rotor nozzle having a chamber deployed with a rotor connecting to a water outlet and an adjusting element, wherein the rotor nozzle structure is equipped with a unitary water outlet for providing a direct stream or a swirl stream, and the adjusting element is switchable by rotation means securing the rotor in rotation or non-rotation status in the chamber.

Furthermore, the chamber possesses a guide annulus and a distributor deployed on the water inlet, and an adjusting element roughly in T shape having a rear area and an insertion extending from the center part, the rear area withstanding the guide annulus and resting against the distributor enabling the insertion to stop or to form a ring track of the water inlet in the rotor.

Furthermore, the distributor provides an aperture having an indented side wall forming an orifice, the rear area of the adjusting element has an axle anchored on the orifice enabling the insertion to swing in the aperture. The rear area of the adjusting element has at least one of the wings relied against the guide annulus and the distributor in order to change the swing angle of the insertion. Besides, the insertion is deployed on the bias comparing to the axle of the rear area. The distributor has an axle in vertical direction to the axle of the adjusting element.

Moreover, by rotating the distributor, the adjusting element embedded between the guide annulus and the distributor deflects and change the swing angle of the insertion. Meanwhile, the insertion of the adjusting element and a part of the distributor mutually form the inner rampart of the ring track, or the adjusting element has the insertion extending to the ring track securing the water inlet of the rotor in a non-rotation status. Because the structure of the rotor nozzle is capable of outputting a direct stream or a swirl stream from a unitary water outlet, the water tunnel inside the rotor nozzle may be devised with a streamline structure.

This invention further provides a watering device equipped with a spray unit composed of a sheath and a base, both of them mutually defining a chamber, wherein the spray unit has a unitary water outlet for outputting a direct stream or a swirl stream, and the adjusting element embedded in the chamber can be rotated to switch the water types from a direct stream to a swirl stream.

This invention further provides a watering device equipped with a spray unit composed of a sheath and a base, both of them mutually defining a chamber, wherein the adjusting element is deployed in partition to the housing and the sheath in order to stop or form the ring track of the water inlet in the chamber.

DETAILED DESCRIPTION OF PREFERRED EMBODIMENTS

Hereinafter to elaborate more specifically of the embodiment of this creation, the narration sets forth from the water outlet of the watering device for a better understanding by the technicians skillful in the arts.

Figure 1:
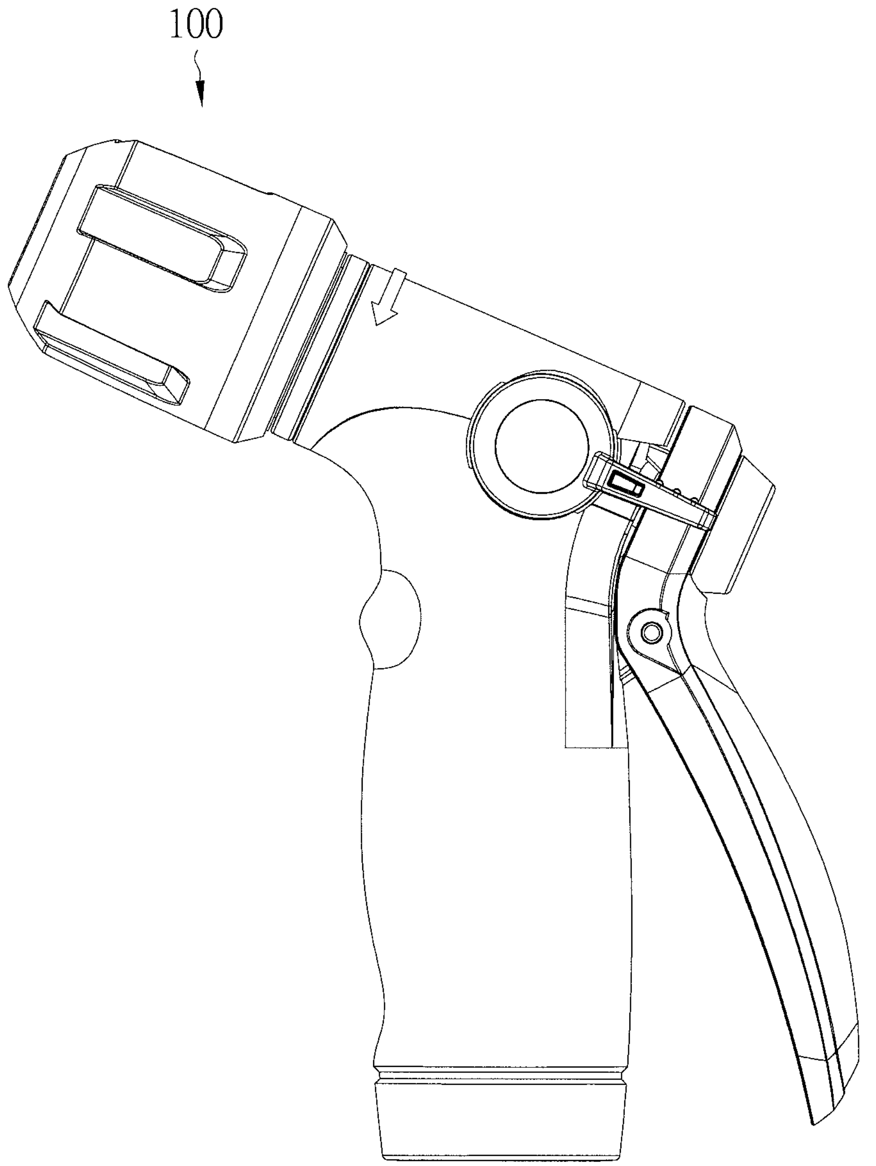
FIG. 1 illustrates a perspective view of the watering device.
Figure 2:
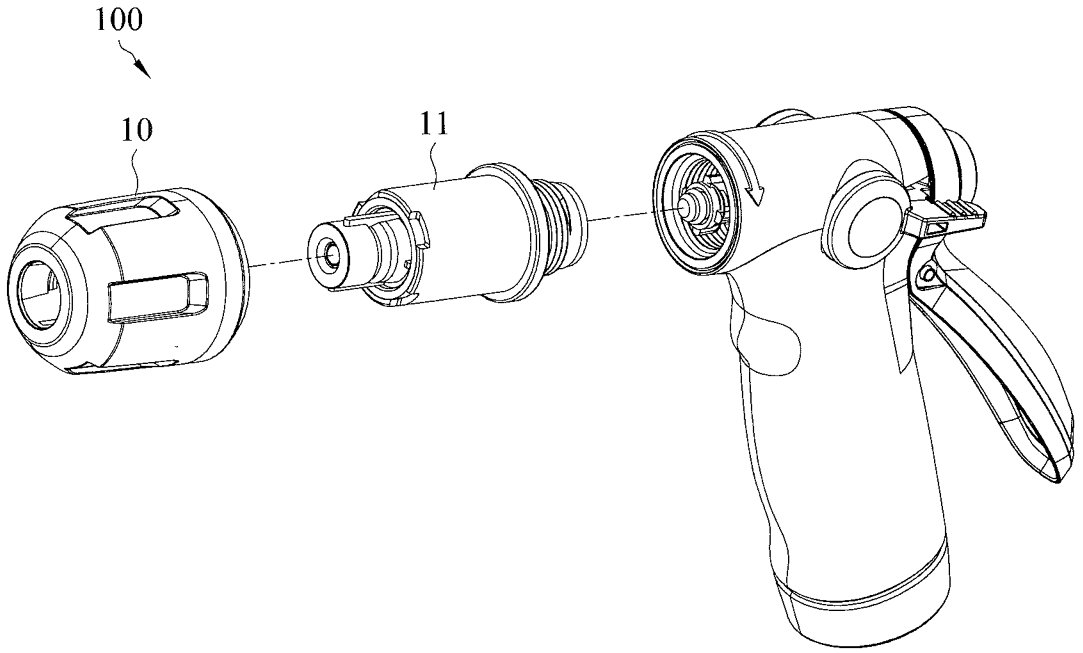
FIG. 2 illustrates a perspective view of the nozzle unit.
Figure 3:
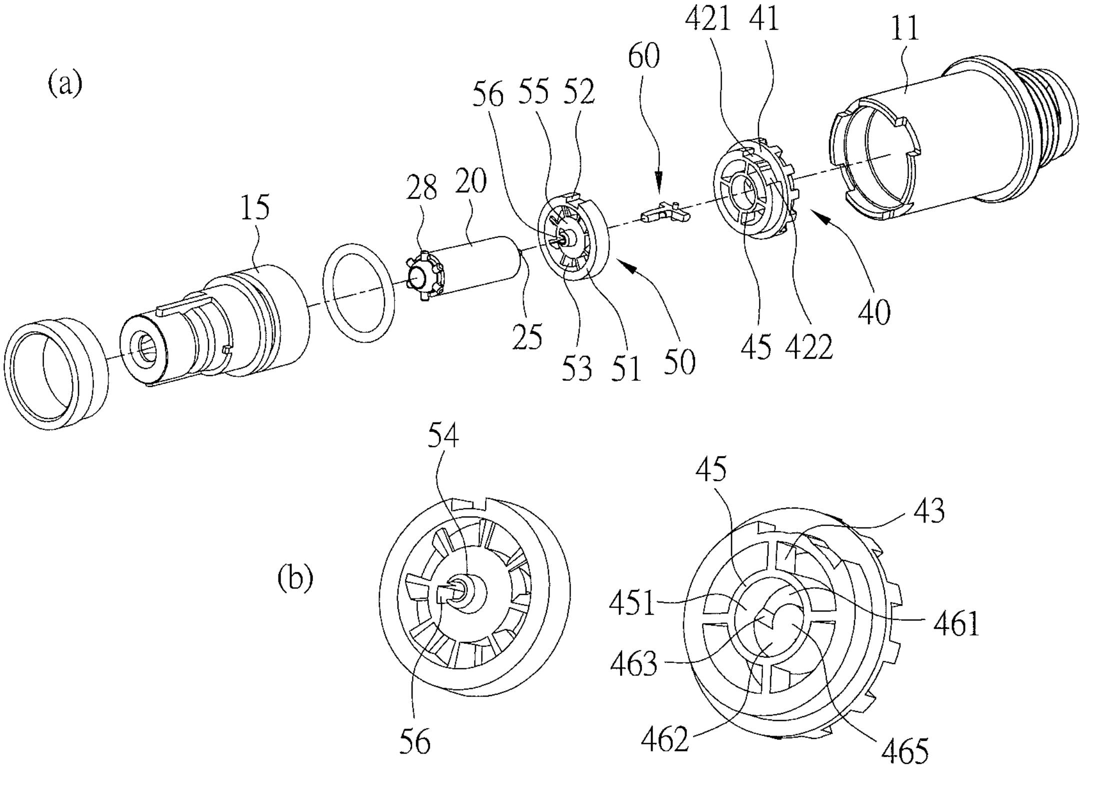
FIG. 3 illustrates an explosive view of the nozzle unit.
Figure 4:
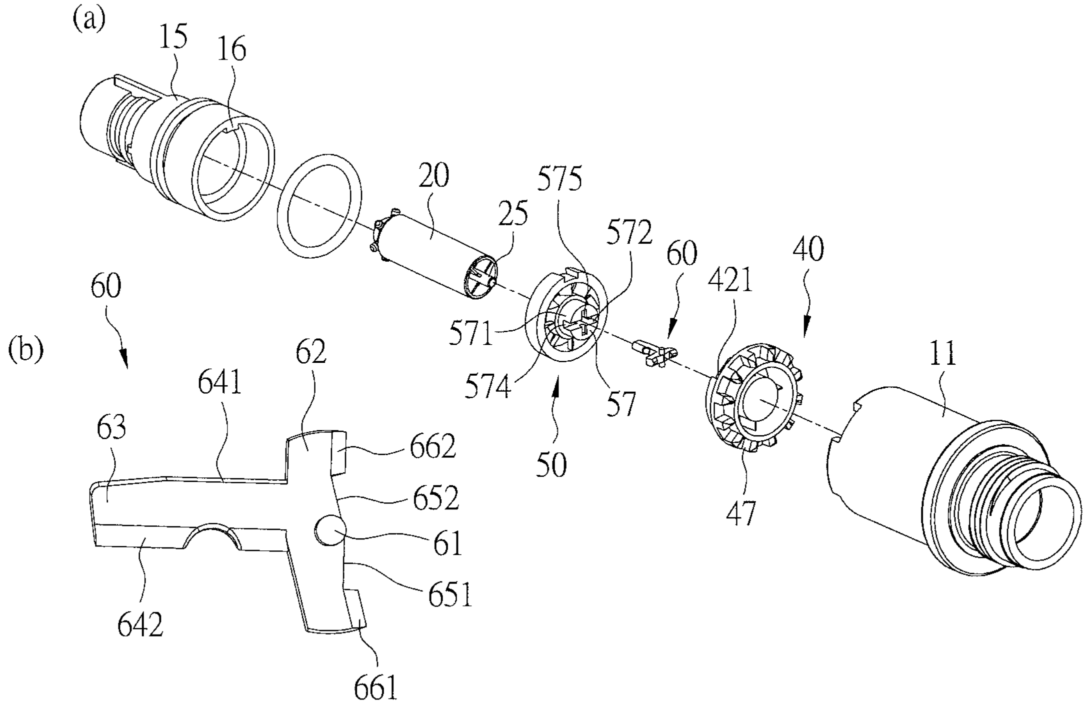
FIG. 4 illustrates another explosive view of the nozzle unit.
Figure 5:
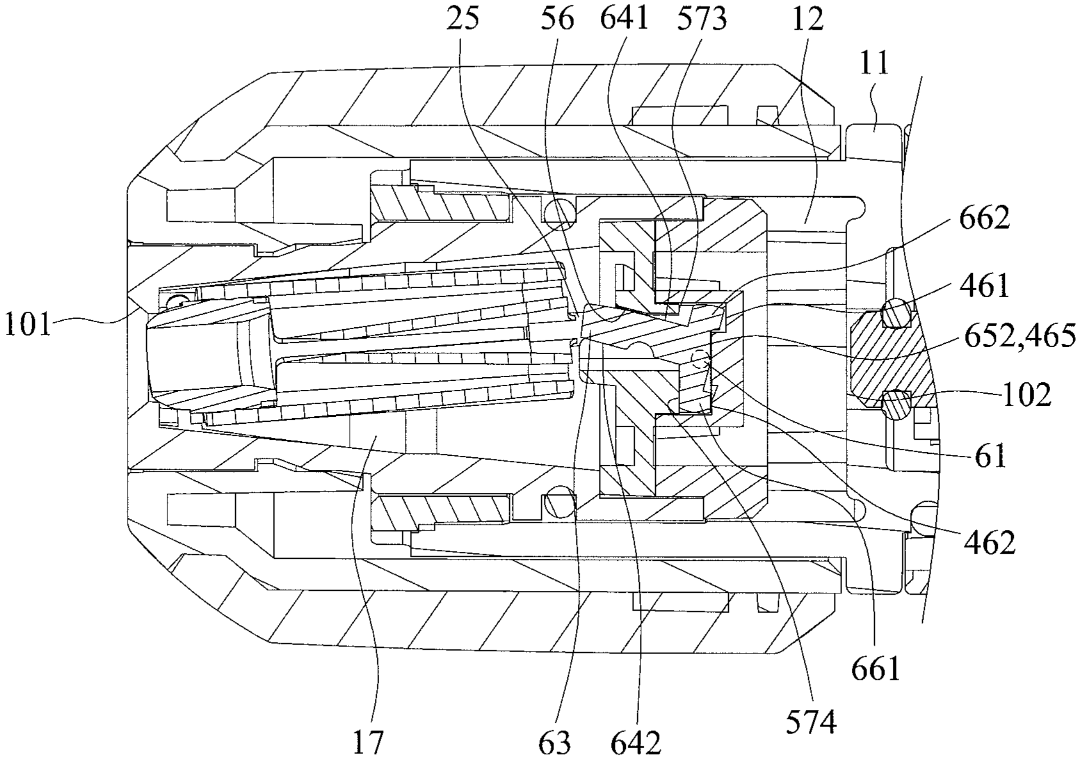
FIG. 5 illustrates a sectional-view of watering device for outputting a direct stream.

FIGS. 1 to 4 illustrate a spray unit 100 of watering device, and the spray unit 100 mainly consists of a rotatable knob 10 coupling to a sheath 11, the rotatable knob 10 and the sheath 11 respectively having a water outlet 101 and a water inlet 102, shown as in FIG. 5, and the water inlet 102 connecting to the water supply. Besides, the spray unit 100 is deployed with a rotor nozzle permitting the water entering the water inlet 102, passing through the chamber 17 of the rotor nozzle and ejecting out from the water outlet 101.

The rotor nozzle consists of a housing 15, a rotor 20, a guide annulus 40, a distributor 50 and an adjusting element 60, wherein the housing is roughly in tubular shape having its front engaged to the inner wall of the rotatable knob 10 for making a synchronized rotation, and the housing 15 has its front located at the water outlet 101, the housing 15 has it back connected to the sheath 11. Therefore, the housing 15 can be drove by the rotatable knob 10 for making a relative rotation toward the sheath 11. Besides, the sheath 11 and the housing 15 mutually define a chamber 17 as an accommodation for the rotor 20, the guide annulus 40 and the distributor 50.

The guide annulus 40 has a circular base 41, a center base 45 in partition to the circular base 41, a plurality of guide vanes 43 connecting to the circular base 41 and the center base 45. The guide annulus 40 further has a plurality of gears 47 protruding toward the water inlet 102 from the circular base 41 and engaged on the position end 12 of the sheath 11 in such a way that the guide annulus 40 is deployed in partition to the water inlet 102, shown as in FIG. 5.

The circular base 41 has an indented outer wall arranged with a curve groove defining two notches 421, 422. The center base 45 of the guide annulus 40 forms a circular groove 451 having a center plane 465 uplifted from the center of the circular groove 451, a lower plane 461 at the same height as the bottom of the center plane 465, a higher plane 462 at the same height as the top of the center plane 465, and two tilt planes 463 at the height between the lower plane 461 and the higher plane 462. Therefore, the lower plane 461, the higher plane 462 and two tile planes 463 form continuous planes around the center plane 465.

The distributor 50 possesses a collar 51 having an outer wall longitudinally equipped with a guide groove 52 enabling the distributor 50 to locate on the guide joint 16 deployed at the back opening of the housing 15 for making a synchronizing rotation accordingly. In assembly, the housing 15 has its back opening rested against the outer ring of the guide annulus 40 in such a way that the guide joint 16 engages to either one of the notches 421, 422 and the guide annulus 40 and the distributor 50 come closer to the water inlet of the chamber 17. The distributor 50 further has the center basis 55 aligned in partition to the collar 51, and a plurality of guide vanes 53 protruding to the collar 51 and each of the guide blades 53 respectively forms a predetermine angle to the center basis 55 in help of generating a swirl stream when the water current passing through the distributor 50.

The central basis 55 of the distributor 50 possesses an axis protruding a central rode 54 toward the water outlet 101, a circle bevel 57 bulging toward the water inlet 102, and an aperture 56 penetrating the circle bevel 57 in an eccentric manner comparing to the axis of the central basis 55. The circle bevel 57 has an outer wall 571 coupled to the inner wall of the circular groove 451 of the center base 45, and a rectangular recess 572 deployed inwardly on the circle bevel 57 comparing to the longitudinal direction of the circle bevel 57, and two ditches 575 arranged on the circle bevel 57 at relative position comparing to the rectangular recess 572. In this embodiment, the central rode 54 of the distributor 50 and the collar 51 mutually define a ring track, a portion of the side wall of the central rode 54 indented in exchange for a portion of aperture 56. The aperture 56 communicates to the rectangular recess 572 in such a way that the rectangular recess 572 forms a bottom in asymmetrical shape and frames two fences 573, 574 deployed in partition to each other, shown as in FIG. 5, and two ditches 575 have the axis aligned with the axis of the distributor 50 in a vertical fashion.

The rotor 20 is tubular in shape having water outlet connected to the front opening of the housing 15, and the water outlet is deployed with a plurality of stoppers 28 coupling to the inner wall of the housing 15, the rotor 20 has its water inlet deployed with a pole 25, the pole 25 of the rotor 20 is received in the ring track of the distributor 50. Therefore, the rotor 20 is deployed eccentrically comparing to the direction of water outlet, leaning backwardly and outwardly. Water current comes from the water inlet 102 of the sheath 11 transporting through the guide vanes 43 of the guide annulus 40, producing a swirl stream as passing through the guide blades 53 of the distributor 50 and spinning without rotating the rotor 20 on its own axis, then the water current entering into the water inlet of the rotor 20 and ejecting out from the front opening of the housing 15.

The adjusting element 60 is roughly in T shape having a rear area 62 and an insertion 63 extending from nearly the center of the rear area 62, the rear area 62 providing a pair of wings 651, 652 in V shape on one end away from the insertion 63, and a couple of ridges 661, 662 stretching toward the circular cavity 451 from the opposite end of the rear area 62. The rear area 62 has an axle 61 deployed on the posterior between the wings 651, 652 and the insertion is located on the bias comparing to the axle 61 of the rear area 62. The adjusting element 60 has the insertion 63 penetrated through the aperture 56 enabling rear area 62 to locate in the rectangular recess 572, the axis 61 pivoted in the ditches 575, the V-shape wings 651, 652 have their either ends relied against the center plane 465 of the guide annulus 40, and either of the ridges 661, 662 rested against the higher planes 462 of the guide annulus 40. As the aperture 56 is bigger than the insertion 63 which enables the adjusting element 60 to swing around the axis 61.

Figure 6:
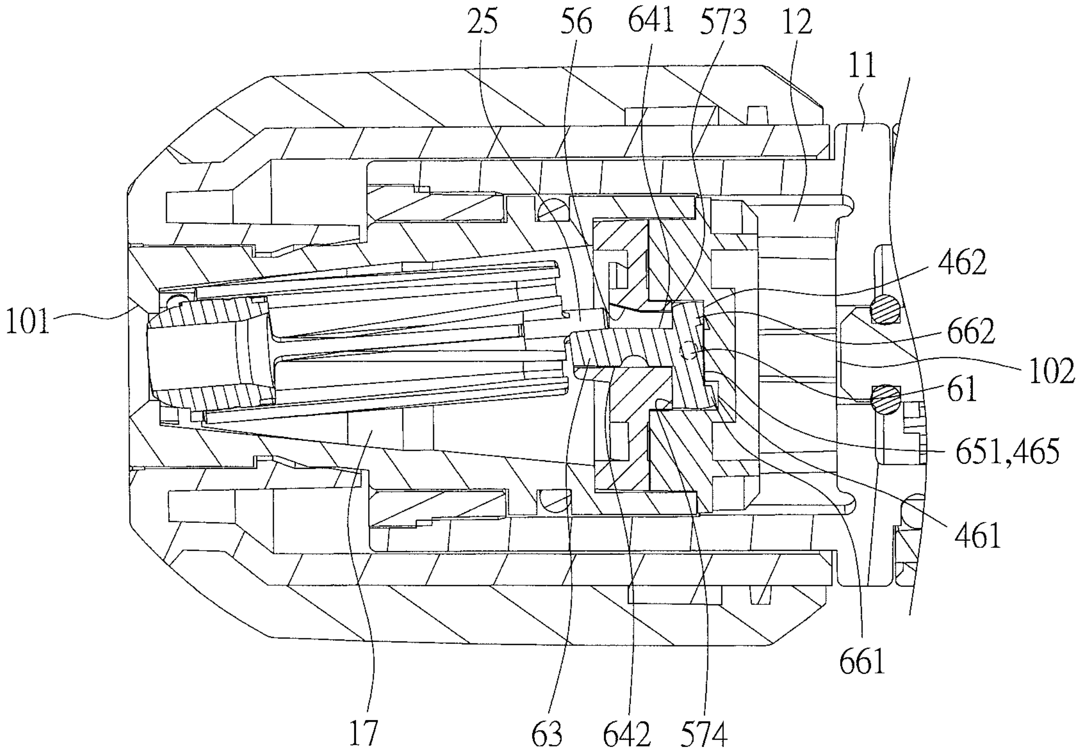
FIG. 6 illustrates a sectional-view of watering device for outputting a swirl stream.

FIG. 5 and FIG. 6 illustrating the housing 15 turns and swings the adjusting element 60 through the distributor 50 for generating a direct or a swirl stream. In FIG. 5, the housing 15 has the guide joint 16 engaged to the notch 422 of the curve groove enabling the ridge 661 of the adjusting element 60 to rely against the higher plane 462 of the center base 45. Hence, the insertion 63 is located outside of the aperture 56 and also located on the ring track securing the rotor 20 in a non-rotation status in order to produce a direct stream from the water outlet 101. Simultaneously, the rear area 62 of the adjusting element 60 has wing 652 contacted to the center plane 465 of the guide annulus 40, and the ridge 662 of the rear area 62 is plugged into the partition created by the lower plane 461 and rests against the fence 574 of the circle bevel 57 by the side between the insertion 63 and the rear area 62 of the distributor 50. In other words, the rear area 62 anchored by the axle 61 has two opposite ends relied against the guide annulus 40 and the distributor 50 in order to prevent the adjusting element 60 from swinging.

When the guide joint 16 of the housing 15 shifts from notch 422 to notch 421, the ridge 661 of the adjusting element 60 slides from the tilt plane 463 of the center base 45 to the partition created by lower plane 461, and the ridge 662 of the adjusting element 60 uplifts to the higher plane 462 as shown in FIG. 6. Hence, when the insertion 63 swings toward the inside of the aperture 56, the inner curb 642 of the insertion 63 enters the central rode 54 landing on its indent side wall, and the outer surface of the central rode 54 forms a ring track together with the outer wall 641 of the insertion 63 which enables the rotor 20 to rotate in the chamber 17 for generating a swirl stream from the water outlet 101. At the meanwhile, the rear area 62 of the adjusting element 60 has the wing 651 connected to the center plane 465 of the guide annulus 40, and ridge 661 of the rear area 62 is plugged into the partition created by the lower plane 461 and rested against the fence 573 of the circle bevel 57 of the distributor 50 together with the side between the rear area 62 and the insertion 63 in order to prevent the adjusting element 60 from swinging.

In this embodiment, when the adjusting element 60 is fully located inside of the housing 15 and the interior of the sheath 11, the adjusting element 60 is therefore swinging through a relative rotation between the guide annulus 40 and the distributor 50, which enables the insertion 63 of the adjusting element 60 to stop or form the ring track of the water inlet of the rotor 20. Hence, water current flows in the spray unit 100 to be ejected a direct stream or a swirl stream at alternation from a unitary water outlet 101 and the water tunnel inside the rotor nozzle may be devised with a streamline structure.

In this embodiment, the rotor 20 has a plurality of stoppers 28 disposed on the water outlet against corresponding slots of the housing 15 in order to prevent the rotation of the rotor 20 and generate a direct stream from the water outlet 101. However, the rotor 20 may has the water outlet rested against the water out side 101 facilitating the rotation of the rotor 20 for producing a conical stream from the water outlet.

In this embodiment, the adjusting element 60 has the outer curb 641 and the inner curb 642 of the insertion 63 respectively deployed on the outer wall and the inner wall of the aperture 56. The side between the rear area 62 and the insertion 63 is engaged to the fences 573, 574 of the rectangular recess 572, and either end of the V-shape wings 651, 652 of the rear area 62 is located on the center plane 465 of the guide annulus 40. The ridges 661, 662 of the rear area 62 are respectively landed on the higher plane 462 of the center base 45 in order to prevent the adjusting element 60 from swinging. In other embodiment, however, either two of the four methods as aforementioned may be utilized to offset the rotational torque of the adjusting element 60 enabling the insertion 63 of the adjusting element 60, enabling the insertion 63 of the adjusting element 60 to stop or form the ring track of the water inlet for the rotor 20. Moreover, the heights of the higher plane 462 and of the center plane 465 may be different.

In the other embodiment, the distributor 50 may be equipped with no central rode 54, the aperture 56 extends from the axis of the center base 55 of the distributor 50. The adjusting element 60 has the rear area 62 connected the circle bevel 57, and the insertion 63 penetrates and swings through the aperture 56. Therefore, the insertion 63 forms an inner rampart or locates in the ring track.

What is claimed is:

1. A watering device comprising a spray unit, the spray unit comprises a sheath and a housing, wherein the sheath and the housing mutually define a chamber;

a distributor having a central rode protruding along an axis of the distributor in the direction of a water outlet, the central rode of the distributor defining a ring track in the chamber, the ring track receiving a water inlet of a rotor;

the distributor having an aperture positioned eccentrically relative to the axis of the distributor, and a portion of a side wall of the central rode being indented;

an adjusting element located in a partition of the housing and the sheath, the adjusting element having an insertion extending through the aperture, and the insertion is adapted to either be deployed in the ring track of the chamber, or to form an inner rampart of the ring track;

wherein a water inlet of the chamber has a guide annulus deployed in the sheath, the distributor located in the housing, the adjusting element having a rear area and the insertion extending from a center of the rear area, with the insertion extending through the distributor the rear area of the insertion rests against the guide annulus; and wherein the adjusting element enables the rotor to output a direct stream or a swirl stream.

2. The watering device as in claim 1, wherein the rear area has at least one first side resting against the guide annulus and at least one side opposite the at least one first side resting against the distributor.

3. The watering device as in claim 1, wherein an axle of the distributor is positioned in a vertical direction relative to an axle of the adjusting element.

4. The watering device as in claim 1, wherein the adjusting element is rotatably switchable.

5. The watering device as in claim 1, wherein the spray unit has a unitary water outlet for outputting the direct stream or the swirl stream.

6. The watering device as in claim 1, wherein the distributor has a center basis and a collar, the center basis providing the central rode and the aperture, the central rode and the collar mutually defining the ring track of the chamber.

* * * * *